US010563709B2

(12) United States Patent
Ramsey

(10) Patent No.: US 10,563,709 B2
(45) Date of Patent: Feb. 18, 2020

(54) WEDGE PLATE WITH ANGLED STRUTS AND ONE-WAY WEDGE CLUTCH WITH WEDGE PLATE HAVING ANGLED STRUTS

(71) Applicant: Schaeffler Technologies AG & Co. KG, Herzogenaurach (DE)

(72) Inventor: John Ramsey, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 227 days.

(21) Appl. No.: 15/695,728

(22) Filed: Sep. 5, 2017

(65) Prior Publication Data

US 2019/0072138 A1 Mar. 7, 2019

(51) Int. Cl.
*F16D 41/069* (2006.01)
*F16D 41/07* (2006.01)
*F16D 15/00* (2006.01)

(52) U.S. Cl.
CPC ......... *F16D 41/069* (2013.01); *F16D 41/076* (2013.01); *F16D 15/00* (2013.01); *F16D 2300/00* (2013.01)

(58) Field of Classification Search
CPC .......................... F16D 2300/00; F16D 41/076
See application file for complete search history.

(56) References Cited

U.S. PATENT DOCUMENTS

| 2,689,633 | A | * | 9/1954 | Turner | F16D 41/069 |
| | | | | | 192/41 A |
| 2,707,038 | A | * | 4/1955 | Szady | F16D 41/076 |
| | | | | | 192/41 A |
| 2014/0014454 | A1 | * | 1/2014 | Davis | G01C 21/3632 |
| | | | | | 192/45.1 |
| 2014/0332335 | A1 | * | 11/2014 | Strong | F16D 41/06 |
| | | | | | 192/43 |
| 2015/0300214 | A1 | * | 10/2015 | Hemphill | F01L 1/34409 |
| | | | | | 123/90.15 |

* cited by examiner

*Primary Examiner* — Mark A Manley

(57) ABSTRACT

A wedge plate for a wedge plate clutch, including: a radially inner surface with a plurality of ramps, each ramp sloping radially inwardly in a first circumferential direction; a radially outer surface; a first circumferential end; a second circumferential end; a gap separating the first circumferential end from the second circumferential end in the first circumferential direction; a first slot open to the radially inner surface and extending radially outwardly; a second slot open to the radially outer surface and extending radially inwardly; and a portion circumferentially located between the first slot and the second slot. a first line passes through the axis of rotation and the portion. A second line passes through the radially inner surface, the portion and the radially outer surface without passing through the first slot or the second slot. An acute angle is formed between the first line and the second line.

17 Claims, 5 Drawing Sheets

WEDGE PLATE WITH ANGLED STRUTS AND ONE-WAY WEDGE CLUTCH WITH WEDGE PLATE HAVING ANGLED STRUTS

TECHNICAL FIELD

The present disclosure relates to a wedge plate with angled struts and a one-way wedge clutch with a wedge plate having angled struts.

BACKGROUND

FIG. 5 is a front view of known wedge plate 300 for use in a one-way wedge clutch. Respective struts 302 are bounded by respective slots 304 and 306. Struts 302 are substantially radially aligned with axis of rotation ARR for plate 300. For example, line L3 passes through strut 302A without intersecting slot 304A or slot 306A. It has been found that struts 302 fail under fatigue testing.

SUMMARY

According to aspects illustrated herein, there is provided a wedge plate for a wedge plate clutch, including: an axis of rotation; a radially inner surface with a plurality of ramps, each ramp in the plurality of ramps sloping radially inwardly in a first circumferential direction; a radially outer surface; a first circumferential end; a second circumferential end; a gap separating the first circumferential end from the second circumferential end in the first circumferential direction; a first slot open to the radially inner surface and extending radially outwardly; a second slot open to the radially outer surface and extending radially inwardly; and a portion circumferentially located between the first slot and the second slot. a first line passes through the axis of rotation and the portion. A second line passes through the radially inner surface, the portion and the radially outer surface without passing through the first slot or the second slot. An acute angle is formed between the first line and the second line.

According to aspects illustrated herein, there is provided a wedge clutch, including: an axis of rotation; an inner race; an outer race; a wedge plate radially disposed between the inner race and the outer race and including a first radially inner surface with a first plurality of ramps, each ramp in the first plurality of ramps sloping radially inwardly in a first circumferential direction; a first radially outer surface; a first circumferential end; a second circumferential end; a gap separating an entirety of the first circumferential end from an entirety of the second circumferential end; a first slot open to the first radially inner surface and extending radially outwardly; a second slot open to the first radially outer surface and extending radially inwardly; and a portion between the first slot and the second slot. A first line passes through the axis of rotation and the portion. A second line passes through the radially inner surface, the portion and the radially outer surface without passing through the first slot or the second slot. An acute angle is formed between the first line and the second line.

According to aspects illustrated herein, there is provided a wedge clutch, including: an axis of rotation; an outer race; an inner race located radially inward of the outer race and including a first plurality of ramps, each ramp in the first plurality of ramps sloping radially inwardly in a first circumferential direction; and a wedge plate. The wedge plate is radially disposed between the inner race and the outer race and includes: a first radially inner surface with second plurality of ramps in contact with the first plurality of ramps, each ramp in the second plurality of ramps sloping radially outwardly in the first circumferential direction; a first radially outer surface in contact with the outer race; a first circumferential end; a second circumferential end; a gap separating an entirety of the first circumferential end from an entirety of the second circumferential end; a first slot open to the first radially inner surface, extending radially outwardly and bounded radially outwardly by a first end; a second slot open to the first radially outer surface, extending radially inwardly and bounded radially inwardly by a second end; and a portion circumferentially located between the first and second slots. The second end is radially inward of the first end. A first line passes through the axis of rotation and the portion. A second line passes through the first radially inner surface, the portion and the first radially outer surface without passing through the first slot or the second slot. An acute angle is formed between the first line and the second line.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 4:
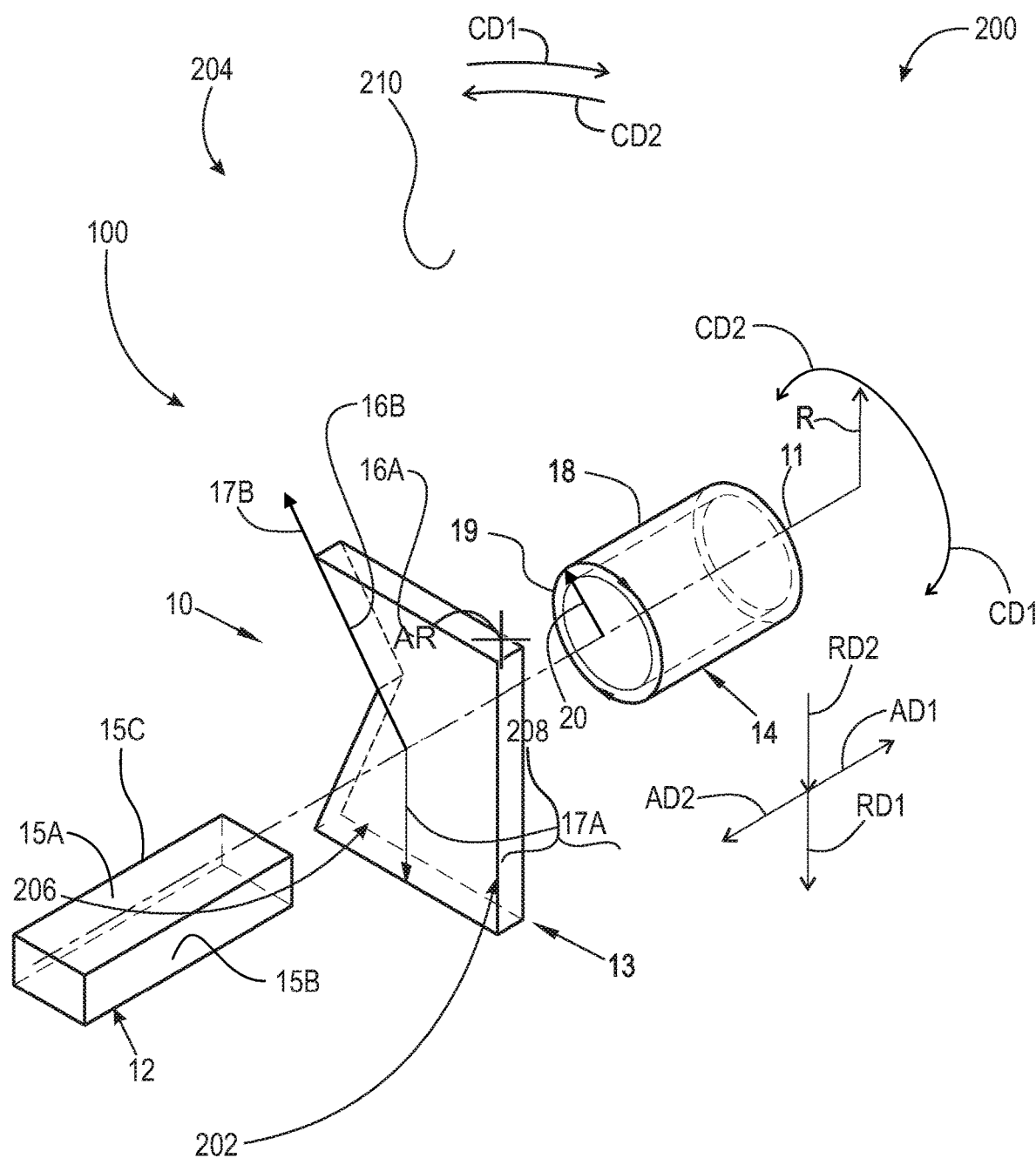
FIG. 4 is a perspective view of a cylindrical coordinate system demonstrating spatial terminology used in the present application; and, FIG. 5 is a front view of a known wedge plate for use in a one-way wedge clutch.
Figure 5:
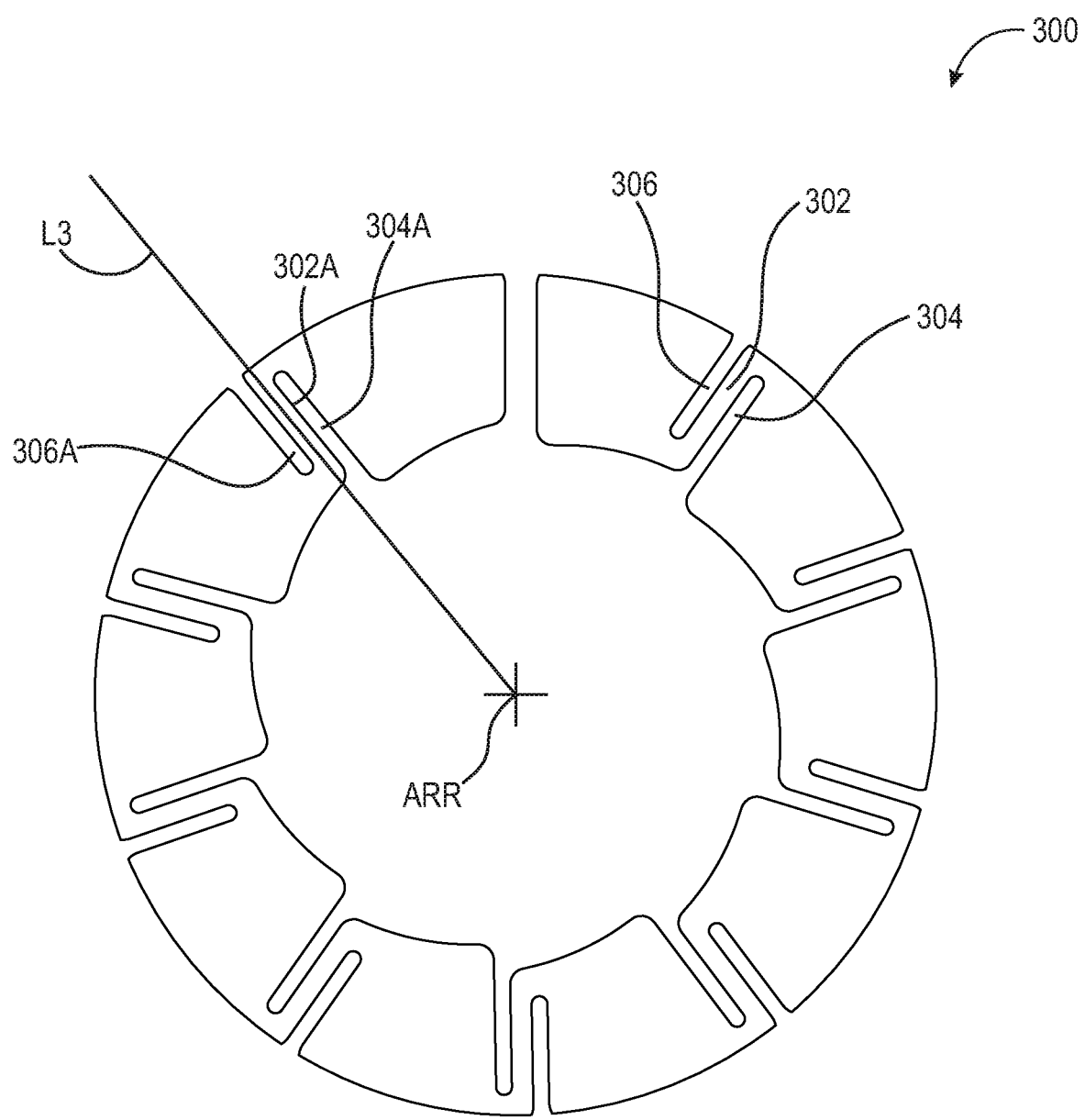

FIG. 4 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, surface 19, defined by radius 20, passes through surface 18.

Axial movement is in direction axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
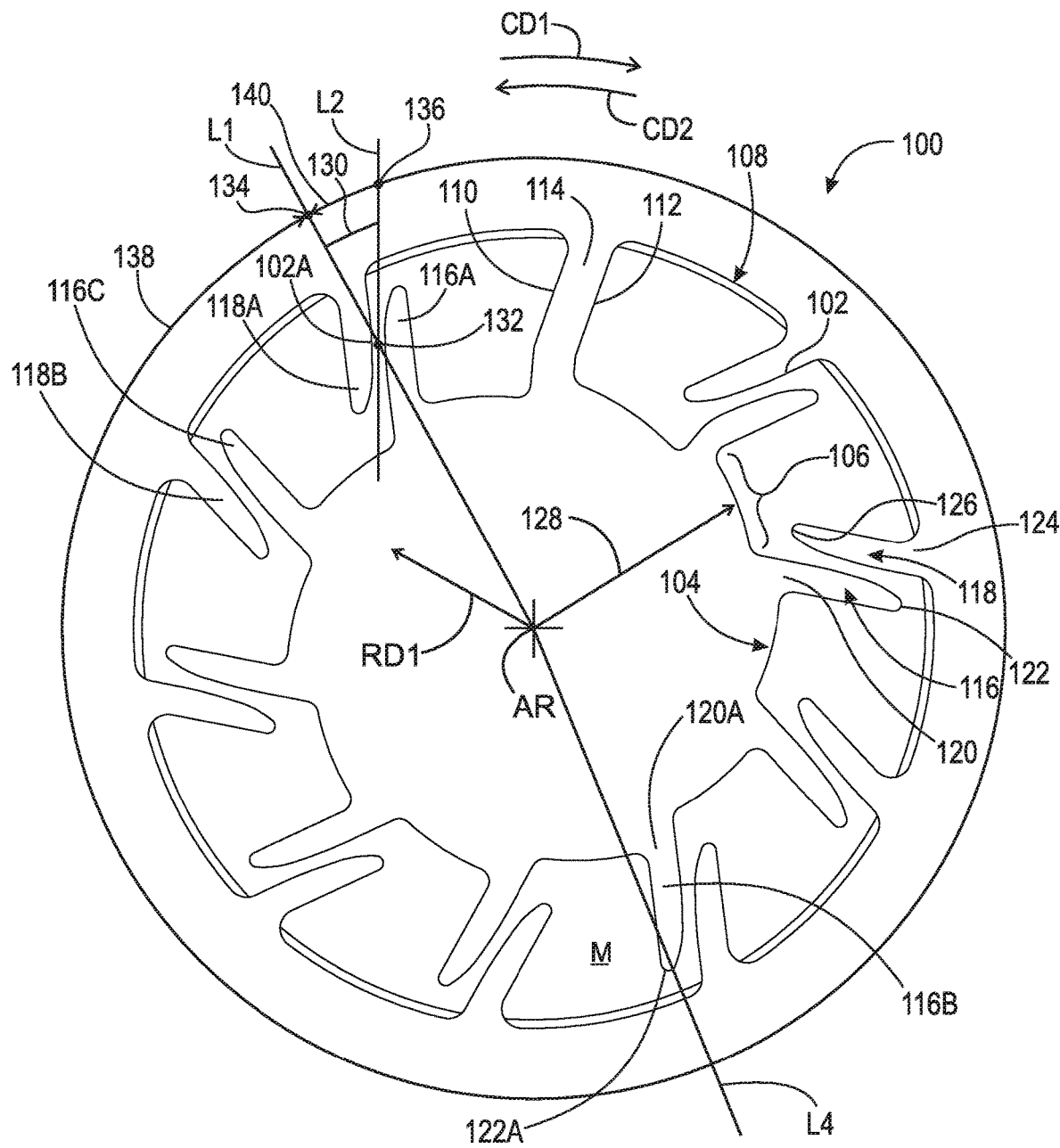
FIG. 1 is a front view of a wedge plate with an angled portion or strut.

FIG. 1 is a front view of wedge plate 100 with angled portions, or struts, 102. Wedge plate 100 is for use in a one-way wedge clutch (further described below) and includes: axis of rotation AR; radially inner surface 104 with ramps 106; radially outer surface 108; circumferential end 110; circumferential end 112; and gap 114. Inner surface 104 defines slots 116; and outer surface 110 defines slots 118. Portions 102 are angled with respect to surface 104 and surface 108. In an example embodiment, each ramp 106 slopes radially inwardly in circumferential direction CD1. Gap 114 separates ends 110 and 112 in direction CD1. Stated otherwise, wedge plate 100 is discontinuous at gap 114 and gap 114 separates an entirety end 110 from an entirety of end 112.

Each slot 116: includes opening 120 open to radially inner surface 104; extends radially outwardly; and includes end 122 bounded by material M forming wedge plate 100. Each slot 118: includes opening 124 open to radially outer surface 108; extends radially inwardly; and includes end 126 bounded by material M forming wedge plate. Ends 126 are radially inward of ends 122.

Each portion 102 is circumferentially located between a respective slot 116 and a respective slot 118. Stated otherwise, each portion 102 is circumferentially bounded by a respective slot 116 and a respective slot 118.

In the discussion that follows, capital letters are used to designate a specific component from a group of components otherwise designated by a three digit number, for example, in the discussion below, slot 116A is a specific example from the plurality of slots 116. As noted above, in an example embodiment, each ramp 106 slopes radially inwardly in direction CD1. That is, distance 128 from axis AR to each ramp 106 decreases moving in direction CD1. Line L1 passes through axis of rotation AR, slot 116A, portion 102A and slot 118A. Line L2 passes through radially inner surface 104, portion 102A and radially outer surface 108 without passing through slot 116A or slot 118A. Acute angle 130 is formed between line L1 and line L2. Line L1 and line L2 can be applied to any portion 102 to obtain acute angle 130. Straight line L4 passes through axis of rotation AR and end 122A of slot 116B without passing through opening 120A of slot 116B. No straight line passes through axis of rotation AR, opening 120A, and end 122A. No slot 116, other than slot 116C, is located between slot 118A and 118B.

Line L2 intersects line L1 at point 132 within portion 102A. Point 134 is on line L1 radially outward point 132. Point 136 is on line L2 radially outward point 132. Point 134 and point 136 are at a same radial distance from axis AR. Point 134 is at distance 138, in circumferential direction CD1, from point 136. Point 134 is at distance 140, in circumferential direction CD2, from point 136. Distance 140 is less than distance 138. Thus, portions 102 slant in direction CD1 along radially outward direction RD1.

In an example embodiment (not shown): ramps 106 slope radially inwardly along direction CD2; and slots 116, slots 118 and portions 102 are slanted in a mirror image about a line analogous to line L1 (passing through axis of rotation AR, a slot 116, a portion 102 and a slot 118). An acute angle is formed between the analog to line L1 and a line analogous to line L2 (passing through radially inner surface 104, the portion 102 and radially outer surface 108 without passing through the slot 116 or the slot 118). Thus, portions 102 slant in direction CD2 along radially outward direction RD1.

Figure 2:
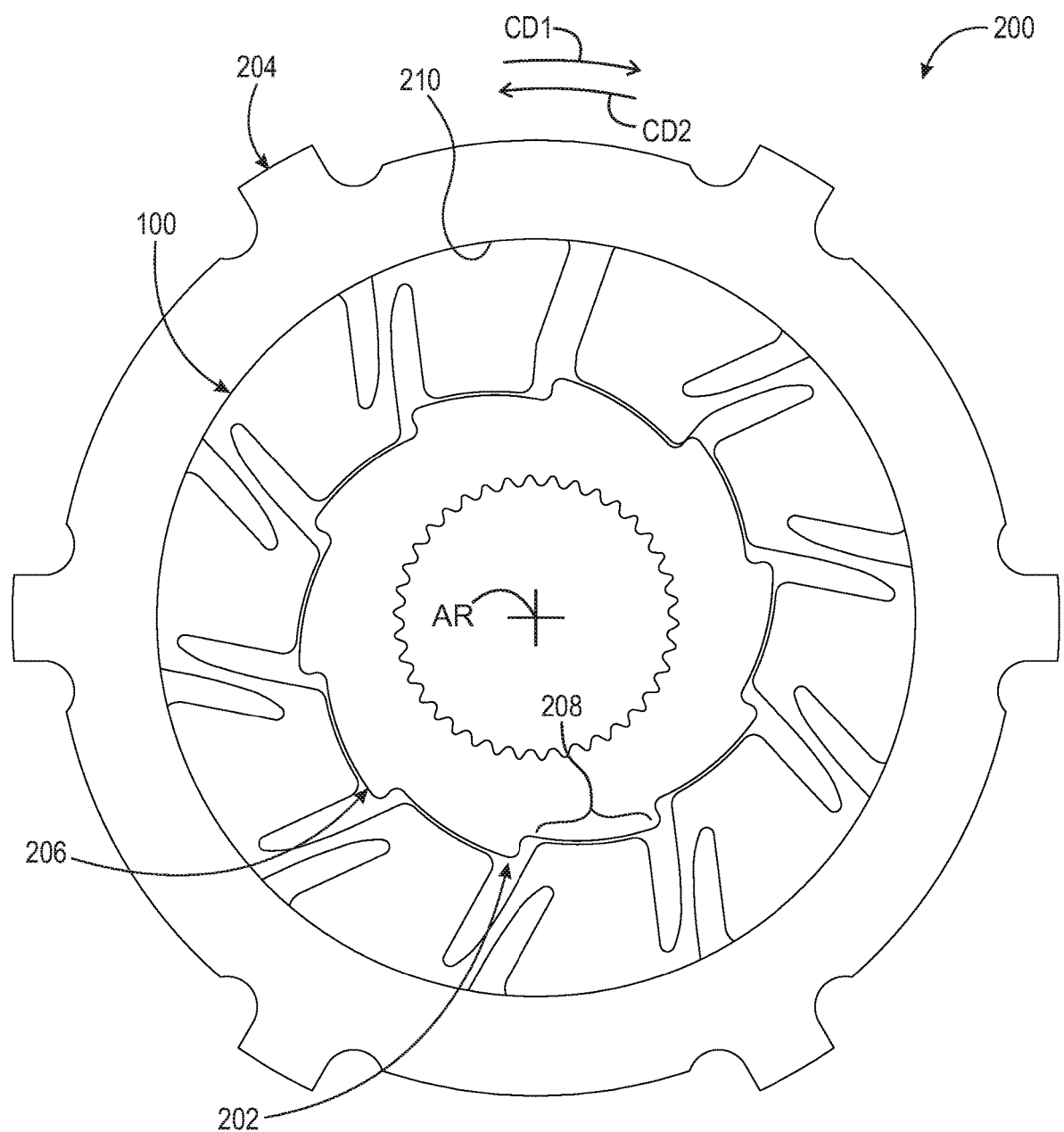
FIG. 2 is a front view of a one-way wedge clutch, including the wedge plate of FIG. 1, in a free-wheel mode.

FIG. 2 is a front view of one-way wedge clutch 200, including wedge plate 100 of FIG. 1, in a free wheel mode. Clutch 200 includes axis of rotation AR, inner race 202, outer race 204 and wedge plate 100. Except as noted, the discussion for wedge plate 100 in FIG. 1 is applicable to wedge plate 100 in FIG. 2. Race 202 is radially inward of race 204 and wedge plate 100 is radially disposed between race 202 and race 204. Inner race 202 includes radially outer surface 206 with ramps 208 in contact with ramps 106. Outer race 204 includes radially inner surface 210 in contact with radially outer surface 108. In an example embodiment, ramps 106 and ramps 208 slope radially inwardly in direction CD1. Wedge plate 100 is preloaded to urge wedge plate 100 radially outwardly to frictionally contact surface 210.

For the free-wheel mode of clutch 200, inner race 202 is rotatable, with respect to outer race 204, in circumferential direction CD2. Note that race 204 can be rotating in direction CD2, except at a rate slower than race 202, or race 204 can be rotationally fixed. To transition from the free wheel mode to a locked mode for clutch 200 (in which race 202, plate 100 and race 204 are non-rotatably connected), inner race 202 rotates in direction CD1 with respect to outer race 204. The relative rotation of inner race 202 with respect to outer race 204 displaces wedge plate 100 radially outwardly to non-rotatably connect inner race 202, wedge plate 100 and outer race 204.

By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

To transition from the locked mode to the free-wheel mode for clutch 200, inner race 202 rotates in direction CD2 with respect to plate 106 and race 204. Ramps 106 slide down (direction CD1) and radially inwardly on ramps 208, reducing the frictional force connecting plate 100 and race 204. Race 202 and plate 100 rotate in direction CD2, overcoming the frictional contact between plate 100 and race 204.

Figure 3:
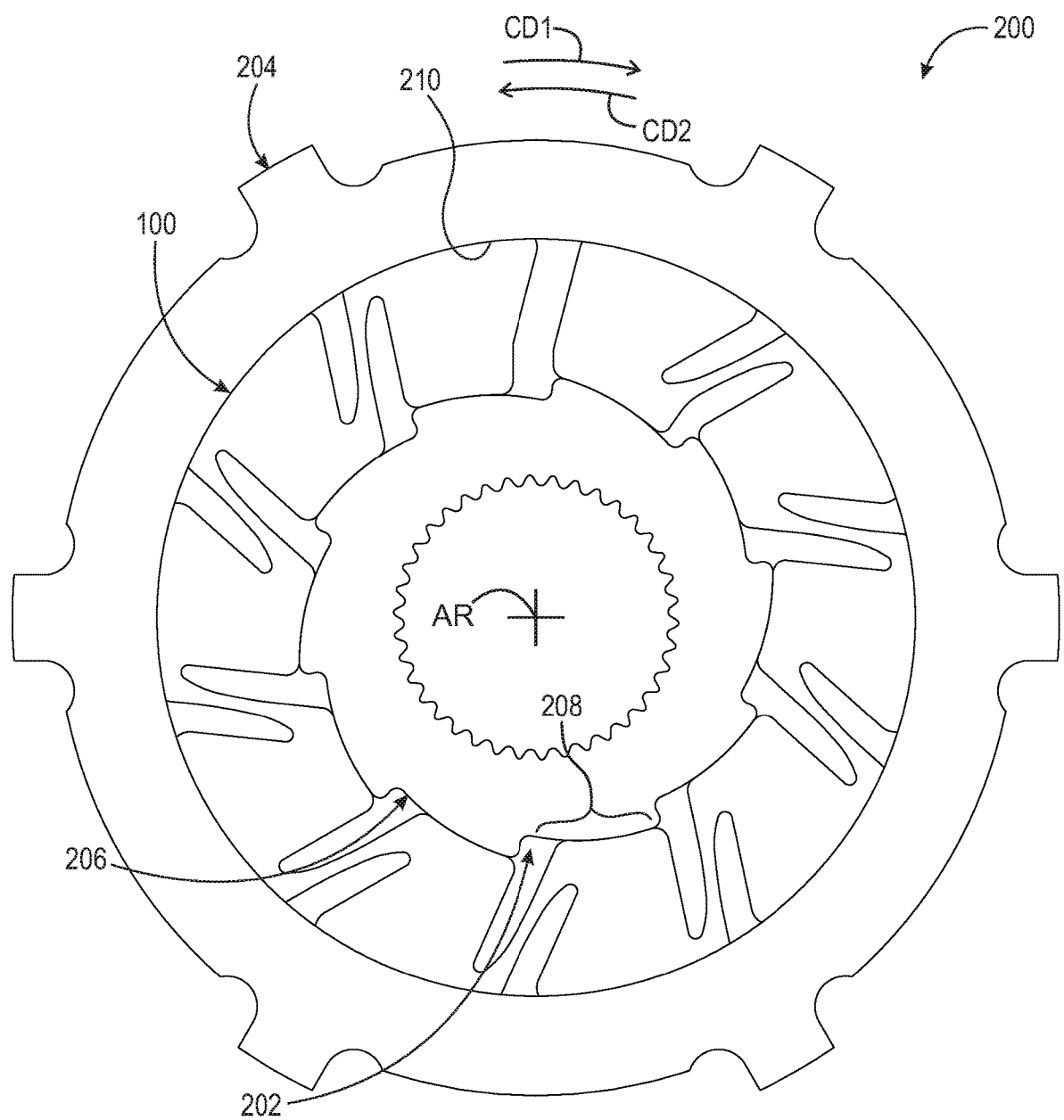
FIG. 3 is a front view of the one-way wedge clutch of FIG. 2, in a locked mode.

FIG. 3 is a front view of one-way wedge clutch 200 of FIG. 2, in the locked mode. To transition from the free-wheel mode to the locked mode, inner race 202 rotates in direction CD1 with respect to plate 106 and race 204. Note that race 204 can be rotating in direction CD1, except at a rate slower than race 202, or race 204 can be rotationally fixed. The radial outward frictional contact between plate 100 and race 204 is sufficient to block rotation of plate 100 with respect to race 202. As a result, ramps 106 slide up (direction CD2) and radially outwardly on ramps 208, forcing plate 100 radially outwardly into compressive engagement with race 204. As torque continues to be applied to race 202 in direction CD1, race 202, plate 100 and race 204 are non-rotatably connected.

In an example embodiment (not shown): ramps 106 and 208 slope radially inwardly in direction CD2; and slots 116, slots 118 and portions 102 are slanted in a mirror image about a line analogous to line L1 (passing through axis of rotation AR, a slot 116, a portion 102 and a slot 118). An acute angle is formed between the analog to line L1 and a line analogous to line L2 (passing through radially inner surface 104, the portion 102 and radially outer surface 108 without passing through the slot 116 or the slot 118). Thus, portions 102 slant in direction CD2 along radially outward direction RD1.

In an example embodiment (not shown), ramps 106 and 208 slope radially inwardly in direction CD1; and slots 116, slots 118 and portions 102 are slanted in a mirror image about a line analogous to line L1 (passing through axis of rotation AR, a slot 116, a portion 102 and a slot 118). An acute angle is formed between the analog to line L1 and a line analogous to line L2 (passing through radially inner surface 104, the portion 102 and radially outer surface 108 without passing through the slot 116 or the slot 118). Thus, portions 102 slant in direction CD2 along radially outward direction RD1.

Advantageously, fatigue testing of wedge plate 100 shows that the slanting of portions 102 increase the durability of wedge plate 100 in comparison with known wedge plates having a strut configuration as shown for wedge plate 300 above.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
radius
AR axis of rotation
ARR axis of rotation
L1 line through portion 102A
L2 line through portion 102A
L3 prior art line
L4 line through end 122A
M material forming wedge plate 100
100 wedge plate
102 portion or strut
104 radially inner surface of plate 100
106 ramp on surface 104
108 radially outer surface of plate 100
110 circumferential end of plate 100
112 circumferential end of plate 100
114 circumferential gap between ends 110 and 112
116 slot in plate 100
116A example slot 116
116B example slot 116
116C example slot 116
118 slot in plate 100
118A example slot 118
118B example slot 118
120 opening for slot 116
120A example opening 120
122 end for slot 116
122A example end 122
124 opening for slot 118
126 end for slot 118
128 distance for ramp 106
130 acute angle between lines L1 and L2
132 point on lines L1 and L2
134 point on line L2
136 circumferential distance
138 circumferential distance
140 circumferential distance
200 one-way wedge clutch
202 inner race
204 outer race
206 radially outer surface of race 202
208 ramp on surface 206
210 radially inner surface of race 204

The invention claimed is:

1. A wedge plate for a wedge plate clutch, comprising:
a radially inner surface with a plurality of ramps, each ramp in the plurality of ramps sloping radially inwardly in a first circumferential direction, the radially inner surface defining a first slot extending diagonally outwardly;
a radially outer surface defining a second slot extending diagonally inwardly;
a first circumferential end; and,
a second circumferential end separated from the first circumferential end by a gap, wherein the wedge plate is supported for rotation around an axis of rotation; wherein a first straight line passes through the axis of rotation, the first slot, and the second slot; wherein the wedge plate is circumferentially non-continuous; wherein the first radially inner surface defines an opening of the first slot facing radially inwardly, and a first end of the first slot bounding the first slot radially outwardly; and wherein a second straight line passes through the axis of rotation and the end of the first slot without passing through the opening of the first slot.

2. The wedge plate of claim 1, wherein:
the second slot bounded radially inwardly by a second end; and,
the second end is radially inward of the first end.

3. The wedge plate of claim 1, wherein
no straight line passes through the axis of rotation, the end of the first slot, and the opening of the first slot.

4. A wedge clutch, comprising:
an inner race;
an outer race supported for rotation about an axis of rotation;
a wedge plate radially disposed between the inner race and the outer race and including:
  a first radially inner surface with a first plurality of ramps, each ramp in the first plurality of ramps sloping radially inwardly in a first circumferential direction, the first radially inner surface defining a first slot extending diagonally outwardly;
  a first radially outer surface defining a second slot extending diagonally inwardly;
  a first circumferential end; and,
  a second circumferential end separated from the first circumferential end by a gap, wherein a first straight line passes through the axis of rotation, the first slot, and the second slot; wherein the wedge plate is circumferentially non-continuous; wherein the first radially inner surface defines an opening of the first slot facing radially inwardly, and a first end of the first slot bounding the first slot radially outwardly; and wherein no straight line passes through the axis of rotation, the end of the first slot, and the opening of the first slot.

5. The wedge clutch of claim 4, wherein:
the second slot is bounded radially inwardly by a second end; and,
the second end is radially inward of the first end.

6. The wedge plate of claim 4, wherein
a second straight line passes through the axis of rotation and the end of the first slot without passing through the opening of the first slot.

7. The wedge clutch of claim 4, wherein:
the first radially inner surface defines a third slot extending diagonally outwardly; and,
the second slot is an only slot, extending diagonally inwardly, between the first slot and the third slot.

8. The wedge clutch of claim 4, wherein:
for rotation of the inner race, with respect to the outer race in the first circumferential direction, the inner race displaces the wedge plate radially outwardly to non-rotatably connect the inner race and the outer race; and,
the inner race is rotatable, with respect to the outer race, in a second circumferential direction opposite the first circumferential direction.

9. The wedge clutch of claim 4, wherein:
the outer race includes a second radially inner surface in contact with the wedge plate; and,
the inner race includes a second radially outer surface with a second plurality of ramps; and,
the second plurality of ramps is in contact with the first plurality of ramps.

10. The wedge clutch of claim 9, wherein each ramp in the second plurality of ramps slopes radially inwardly in the first circumferential direction.

11. The wedge clutch of claim 4, wherein the wedge plate is pre-loaded to urge the wedge plate radially outwardly into contact with the outer race.

12. The wedge clutch of claim 4, wherein the inner race is a radially innermost component of the wedge clutch.

13. A wedge clutch, comprising:
an outer race;
an inner race:
  located radially inward of the outer race; and,
  including a first plurality of ramps, each ramp in the first plurality of ramps sloping radially inwardly in a first circumferential direction; and,
a wedge plate radially disposed between the inner race and the outer race and including:
  a first radially inner surface with a second plurality of ramps in contact with the first plurality of ramps, each ramp in the second plurality of ramps sloping radially inwardly in the first circumferential direction, the first radially inner surface defining a first slot;
  a first radially outer surface in contact with the outer race;
  a first circumferential end; and,
  a second circumferential end separated from the first circumferential end by a gap, wherein:
the outer race is supported for rotation with respect to the inner race about an axis of rotation;
in a locked mode of the wedge clutch, the inner race and the outer race are non-rotatably connected;
in a free-wheel mode of the wedge clutch, the inner race is rotatable with respect to the outer race in a second circumferential direction, opposite the first circumferential direction;
to transition from the locked mode to the free-wheel mode, the inner race rotates in the second direction with respect to the wedge plate and the outer race to displace the wedge plate radially outwardly;
the wedge plate is circumferentially non-continuous;
the first radially inner surface defines an opening of the first slot facing radially inwardly, and an end of the first slot bounding the first slot radially outwardly; and,
a straight line passes through the axis of rotation and the end of the first slot without passing through the opening of the first slot.

14. The wedge clutch of claim 13, wherein:
for rotation of the inner race, with respect to the outer race in the first circumferential direction, the inner race displaces the wedge plate radially outwardly to non-rotatably connect the inner race and the outer race; and,
the inner race is rotatable, with respect to the outer race, in a second circumferential direction opposite the first circumferential direction.

15. The wedge clutch of claim 13, wherein the wedge plate is pre-loaded to urge the wedge plate radially outwardly into contact with the outer race.

16. The wedge clutch of claim 13, wherein
no straight line passes through the axis of rotation, the end of the first slot, and the opening of the first slot.

17. The wedge clutch of claim 13, wherein the inner race is a radially innermost component of the wedge clutch.

* * * * *